(12) United States Patent
De Chanterac

(10) Patent No.: US 9,042,289 B2
(45) Date of Patent: *May 26, 2015

(54) METHODS AND DEVICES FOR POWER-AWARE DATA SYNCHRONIZATION IN WIRELESS DEVICES

(71) Applicant: MOTOROLA MOBILITY LLC, Libertyville, IL (US)

(72) Inventor: Cyril M De La Cropte De Chanterac, Chicago, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 120 days.

This patent is subject to a terminal disclaimer.

(21) Appl. No.: 13/922,274

(22) Filed: Jun. 20, 2013

(65) Prior Publication Data

US 2013/0286913 A1    Oct. 31, 2013

Related U.S. Application Data

(63) Continuation of application No. 12/952,222, filed on Nov. 23, 2010, now Pat. No. 8,560,026.

(51) Int. Cl.
| | |
|---|---|
| *H04W 52/02* | (2009.01) |
| *H04W 4/00* | (2009.01) |
| *H04W 76/06* | (2009.01) |
| *H04W 24/10* | (2009.01) |
| *H04W 52/04* | (2009.01) |

(52) U.S. Cl.
CPC .......... *H04W 52/0251* (2013.01); *H04W 24/10* (2013.01); *H04W 52/0245* (2013.01); *H04W 52/0264* (2013.01); *H04W 52/04* (2013.01); *H04W 76/066* (2013.01); *Y02B 60/50* (2013.01)

(58) Field of Classification Search
CPC ............ H04W 52/04; H04W 52/0245; H04W 52/0264; H04W 24/10; H04W 76/066; H04W 52/0209; H04W 52/0225; H04W 52/0251; H04W 52/46; H04W 52/0203; H04W 84/12; H04W 56/00; H04W 56/0045; H04W 56/002; H04W 56/0075; H04W 56/0095; H04B 7/18543
See application file for complete search history.

(56) References Cited

U.S. PATENT DOCUMENTS

| | | | |
|---|---|---|---|
| 6,748,246 B1 | 6/2004 | Khullar | |
| 6,807,427 B1 * | 10/2004 | Sakamoto et al. | ......... 455/456.1 |
| 7,738,921 B2 * | 6/2010 | Silverbrook et al. | ......... 455/557 |
| 7,949,747 B1 * | 5/2011 | Van Oosterwijck et al. | . 709/224 |

(Continued)

*Primary Examiner* — Candal Elpenord
(74) *Attorney, Agent, or Firm* — Leydig, Voit & Mayer, Ltd.

(57) ABSTRACT

Disclosed are devices and methods of a communication device including initiating an initial communication via a modem in response to a data pull communication event or a data push communication event and determining by the controller a measured network condition associated with transmitting the initial communication as well as determining by the controller the power consumption of the initial communication based on a measured network condition value processed by monitoring the modem. Methods of a communication device further include comparing the power consumption value with a predetermined power consumption value stored in the memory related to a predetermined acceptable measured network condition value for this type of communication event, and terminating by the controller, the communication when the power consumption value exceeds the predetermined power consumption value based upon the acceptable measured network condition value for this type of communication event.

6 Claims, 3 Drawing Sheets

(56) References Cited

U.S. PATENT DOCUMENTS

| | | |
|---|---|---|
| 8,442,025 B2 * | 5/2013 | Borsella et al. ............... 370/349 |
| 2004/0243617 A1 | 12/2004 | Bayyapu |
| 2006/0194549 A1 | 8/2006 | Janik et al. |
| 2007/0238440 A1 | 10/2007 | Sengupta et al. |
| 2008/0167025 A1 | 7/2008 | Williamson |
| 2008/0240001 A1 | 10/2008 | Struhsaker et al. |
| 2008/0284596 A1 | 11/2008 | Fuchs et al. |
| 2008/0285496 A1 * | 11/2008 | Fuchs et al. .................. 370/311 |
| 2009/0017860 A1 | 1/2009 | Cole |
| 2009/0022068 A1 | 1/2009 | Iyer |
| 2009/0061825 A1 | 3/2009 | Nellakantan et al. |
| 2009/0168676 A1 * | 7/2009 | Olson ........................... 370/311 |
| 2009/0232097 A1 | 9/2009 | Taneja |
| 2009/0274202 A1 | 11/2009 | Hanke et al. |
| 2010/0029294 A1 | 2/2010 | Matsuoka |
| 2011/0007679 A1 * | 1/2011 | Tsai ............................ 370/311 |
| 2011/0038432 A1 | 2/2011 | Potkonjak |
| 2011/0051640 A1 * | 3/2011 | Ramesh et al. ............... 370/311 |
| 2011/0207509 A1 | 8/2011 | Crawford |

\* cited by examiner

DATA "PUSH"

DATA "PULL"

METHODS AND DEVICES FOR POWER-AWARE DATA SYNCHRONIZATION IN WIRELESS DEVICES

FIELD OF THE INVENTION

Disclosed are methods and devices for power-aware data synchronization in wireless devices, and in particular, methods and devices for determining a power consumption value of an initial communication based on the measured network condition value processed by monitoring the modem.

BACKGROUND

Users of mobile communication devices often keep their devices in "always on" mode. In this way, mobile communication devices can run applications that respond to a data pull communication event or a data push communication event even while the user is not actively using the device. During an always on mode, background data transfers can include for example, weather widget updates, news feeds, social media updates, and email syncs. In some cases, a pull communication event or a push communication event can be necessary at that moment. In other cases, a pull communication event or a push communication event is not necessary at that moment.

DETAILED DESCRIPTION

Figure 1:
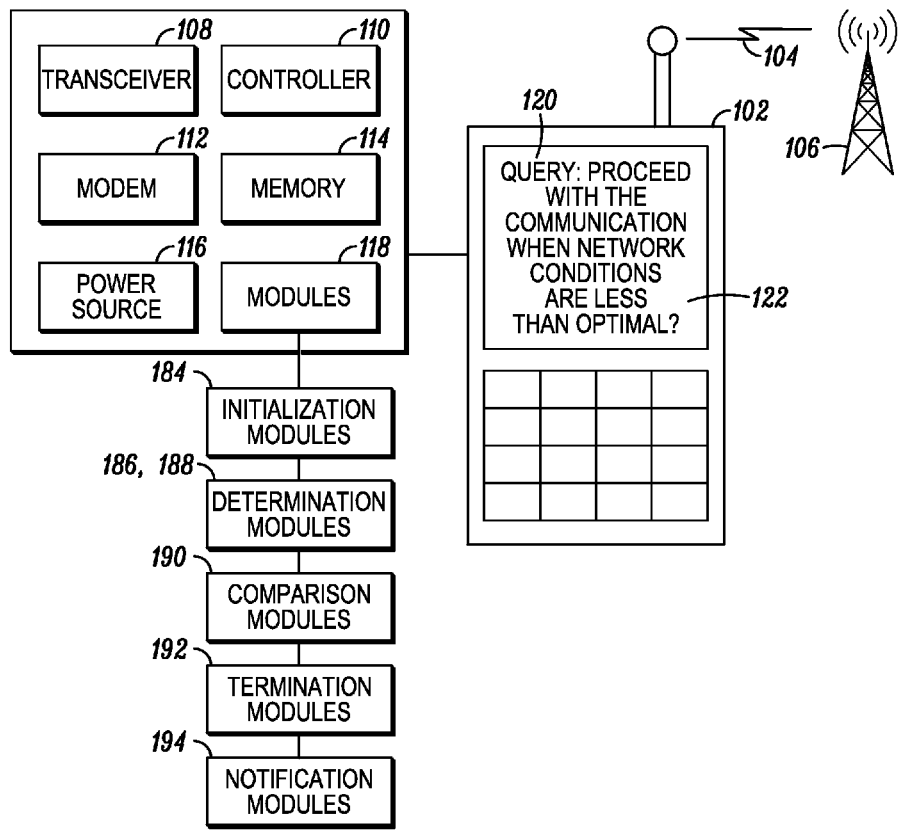
FIG. 1 depicts an embodiment of a communication device in communication with a remote server.

As the demand for packet data is growing, the battery life of wireless devices has become even more of a challenge. For example, Smartphone are always connected devices and therefore can receive push and pull data transfers. However, the periodic data connections over the cellular modem significantly affect battery current drain, and thus reduce the mobility and the user experience. The quality of the network connection varies a lot and changes rapidly because of multiple parameters.

Depending upon network conditions, the power required for data synchronization can vary. Data synchronization is required for initial handshakes and continued communication. For example, in a push communication event, a remote server may send a signal asking if an asleep communication device "is there." The device will wake up, and determine the power required to answer the remote server. In a typical situation, the device will respond, "yes, I am here." Prior to an interaction, and/or during an interaction, the device is aware of it power requirements to communicate with the remote server based upon the network conditions.

Network conditions can depend upon different factors. A mobile communication device's location with respect to a transmission tower or signal interference may be such factors. For example, when a device is within a building, the signal between the device and the tower can be diminished. Interference can be caused by noisy conditions, for example, when there are many communication devices within close proximity to one another. There may be other factors that can contribute to less than ideal network conditions. In any event, when network conditions are not ideal, the amount of power required for data synchronization increases not linearly, but exponentially. That is, under poor network conditions the cost in power for synchronizing data can be multiplied by a substantial factor significantly affecting battery life.

Disclosed are devices and methods of a communication device including initiating an initial communication via a modem in response to a data pull communication event or a data push communication event and determining by the controller a measured network condition associated with transmitting the initial communication as well as determining by the controller the power consumption of the initial communication based on a measured network condition value processed by monitoring the modem. Methods of a communication device further include comparing the power consumption value and quality of service with predetermined power consumption value and quality of service stored in the memory related to a predetermined acceptable measured network condition value (including quality of service) for this type of communication event, and terminating by the controller, the communication when the power consumption value for this upcoming data transfer exceeds the predetermined power consumption value based upon the acceptable measured network condition value for this type of communication event.

To extend overall battery life by avoiding power inefficient data synchronization, the method includes isolating the modem power consumption associated with a data transfer. The modem power consumption is reported to the applications. By intelligently considering network conditions before initiating a data transfer involving data synchronization, the battery life of a wireless device can be saved substantially.

The method can include computing the power consumption associated with a modem activity which can then be mapped to a calling application. The "live modem power foot print" of an application can be established thus enabling power-aware data synchronization over the cellular modem. That is modem power consumption foot prints of sub-systems can be reported to one or more applications and/or report the power consumption of transport layers into client/server protocols can be reported.

In "pull" configuration the wireless device would get an estimate of the power cost based on network conditions before initiating the data transfer. The application calling the data synchronization would be delayed and a new attempt would be scheduled later on until a predefined failed attempt count has been reached or network conditions are considered good enough from a power perspective for synchronizing the data.

In "push" configuration the server pings the phone for data synchronization. When the wireless device is paged the network conditions can be established. In case the power consumption is estimated to be too high for the data synchronization the transfer is aborted and re-schedule later on. Obviously if the mobile device is connected to a wall charger the battery will not be drained by the network activities. The data synchronization can be scheduled at any time and there is not need to check network conditions and associated power efficiency before proceeding.

The method can be based on the time stamping of strategic modem events (change of baseband frequency, enable/disable of functional power domain or power island enable/disable of radio transceiver, power amplifier transmit level and the like), weighting with known power consumption levels from modeling and/or measurements, and/or a report provided service for the cost of power (call time, amount of data transferred and the like). That is, this method can include decision making based upon the cost in power consumption (or battery drain) for a push or pull data transfer. If it costs too much energy to the battery and the type of transfer is not high priority, then this type of communication can be delayed until network conditions are better by avoiding data synchronization and thus energy consumption is lower.

The instant disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. While the preferred embodiments of the invention are illustrated and described here, it is clear that the invention is not so limited. Numerous modifications, changes, variations, substitutions, and equivalents will occur to those skilled in the art having the benefit of this disclosure without departing from the spirit and scope of the present invention as defined by the following claims.

It is understood that the use of relational terms, if any, such as first and second, up and down, and the like are used solely to distinguish one from another entity or action without necessarily requiring or implying any actual such relationship or order between such entities or actions.

Much of the inventive functionality and many of the inventive principles are best implemented with or in software programs or instructions and integrated circuits (ICs) such as application specific ICs. In the interest of brevity and minimization of any risk of obscuring the principles and concepts according to the present invention, discussion of such software and ICs, if any, is limited to the essentials with respect to the principles and concepts within the preferred embodiments.

FIG. 1 depicts an embodiment of a communication device 102 in communication 104 with a remote server 106. The device 102 can include a transceiver 108, a controller 110, a modem 112, a memory 114, a power source such as a battery 116, in addition to various other components. The mobile communication device 102 may be implemented as a cellular telephone (also called a mobile phone). The mobile communication device 102 represents a wide variety of devices that have been developed for use within various networks. Such handheld communication devices include, for example, cellular telephones, messaging devices, personal digital assistants (PDAs), notebook, tablets or laptop computers incorporating communication modems, mobile data terminals, application specific gaming devices, video gaming devices incorporating wireless modems, and the like. Any of these portable devices may be referred to as a mobile station or user equipment. Herein, wireless communication technologies may include, for example, voice communication, the capability of transferring digital data, SMS messaging, Internet access, multi-media content access and/or voice over internet protocol (VoIP).

The server 106 is depicted as a remote server within a wireless communication network. The network of course may be any type of wireless network including an ad hoc or wireless personal area network, a WiFi or wireless local area network, and a cellular or wireless wide area network. Likewise, the server 106 may be of any suitable configuration. The server 106 may be implemented as a single server or as a plurality of servers in communication in any arrangement. The operations of the server 106 may be distributed among different servers or devices that may communicate in any manner. It is understood that the depiction in FIG. 1 is for illustrative purposes.

Also depicted are modules 118 including an initialization module 184, determination modules 186 and 188, a comparison module 190, a termination module 192 and a notification module 194. The modules can be described as a high level functions for which in a real-system architecture may take on a substantially different form, and which can depict certain processes of the methods as described herein. The real system architecture can be implemented in software, such as in the form of one or more sets of prestored instructions, and/or hardware, which can facilitate the operation of the mobile station or electronic device as discussed below. The modules may be installed at the factory or can be installed after distribution by, for example, a downloading operation. The operations in accordance with the modules will be discussed in more detail below.

The device 102, in an always on mode, and/or out of sleep mode, may be aware of the network conditions, based on, for example, signal strength, transmit power level, and/or Radio Resource Control (RRC) state of the radio transmitter. The network conditions are based on the modem power awareness capability of the device 102 as opposed to power awareness applications. When communication 104 is initiated, the described modem power awareness capability of the device 102 measures the network conditions based upon calculations and then typically reports them to the network 104 and/or adapts its power level to network's 104 commands. If the data rate of the communication 104 is lower because of poor quality of service due to poor network conditions, number of retransmissions or other reasons, the device 102 will increase its overall power consumption subtantially compared to the power rate in optimal network conditions to carry out the communication. In this situation data synchronization can take as long as several minutes, where in optimal network conditions, it can be substantially less. As a result of both higher power consumption in poor radio conditions and a slower data throughput the overall energy for the data transfer can be multified by significant factor, thus making the data transfer energy inefficient and greatly impacting battery life.

The described devices and methods of the devices utilize the modem power awareness capability of the device 102 before data synchronization is attempted in a communication 104, in one embodiment, depending upon the type of communication. For example, if background data transfers include for example, weather widget updates, news feeds, social media updates, and email syncs, the time sensitivity of these types of communication event may be considered low, and therefore can be delayed either by the application of the device 102 or the server 106 until the power consumption conditions of the network connection are considered good enough by the modem for the data transfer to be power efficient.

In one embodiment, prioritization of background data transfers can be set by default. In another embodiment, prioritization can be provided by user input. In another embodiment, a query 120 such as that depicted on the display screen 122 of the device 102 can ask whether to "proceed with the communication when network conditions are optimal?" It is understood that the determination of which pull or push data transfers are postponed and/or cancelled can be made in any suitable manner. In any event, the described method can extend battery 116 life significantly because inefficient (low data throughput and high transmit power levels) data transfers are avoided.

Figure 2:
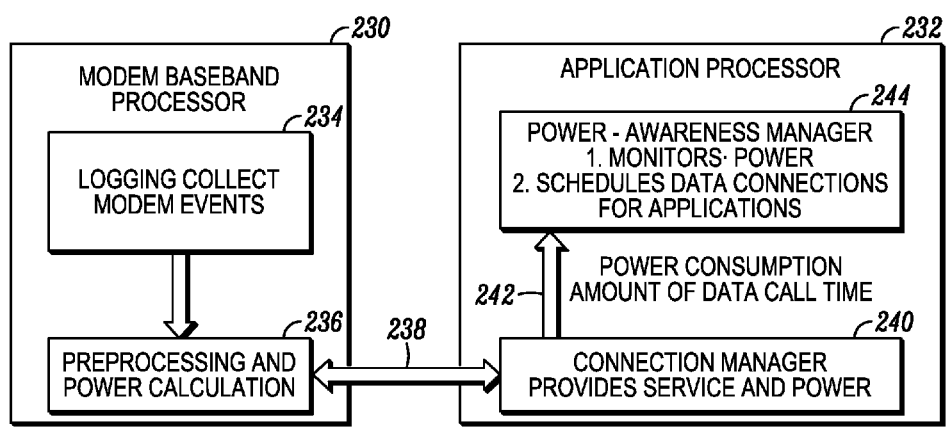
FIG. 2 depicts a high level illustration of a method of an embodiment of a system architecture.

FIG. 2 depicts a high level illustration of a method of an embodiment of a system architecture including a modem baseband processor 230 and an application processor 232, which of course can be separate processors or the same processor running different applications.

Upon initiating an initial communication via the modem 112 (see FIG. 1) in response to a data pull communication event or a data push communication event, the modem baseband processor 230 can log or collect modem events 234. As mentioned above, the method can be based on the time stamping of strategic modem events (change of baseband frequency, enable/disable of power domain or power island, enable/disable of radio transceiver, power amplifier transmit level and the like), weighting with known power consumption levels from modeling and/or measurements, and/or a report provided service for the cost of power (call time, amount of data transferred and the like).

In other steps, determining by the controller 110 (see FIG. 1) a measured network condition value associated with transmitting the initial communication and determining by the controller 110 a power consumption value of the initial communication based on the measured network condition value processed by monitoring the modem, this method can include decision making based upon the cost in power consumption 236 (or battery drain) for a push or pull data transfer. Determining a measured network condition associated with transmitting the communication can include one or more of determining channel quality, determining signal strength, and determining a power level required for transmitting. It is understood that any manner in which to measure the network condition is within the scope of this discussion.

The modem baseband processor 230 is communicating 238 with the application processor 232. Comparing by the controller 110 (see FIG. 1), the power consumption value with a predetermined power consumption value stored in the memory 114 related to a predetermined acceptable measured network condition value for this type of communication event can be carried out by a connection manager 240 which provides service and power. Values 242 for power consumption, the amount of data of the data transfer, and/or call time can be used by a power-awareness manager 244 that monitors the power, and can terminate or reschedule data connections for the applications. Terminating by the controller 110, the communication when the power consumption value exceeds the predetermined power consumption value based upon the acceptable measured network condition value for this type of communication event can be carried out by the power-awareness manager 244.

Figure 3:
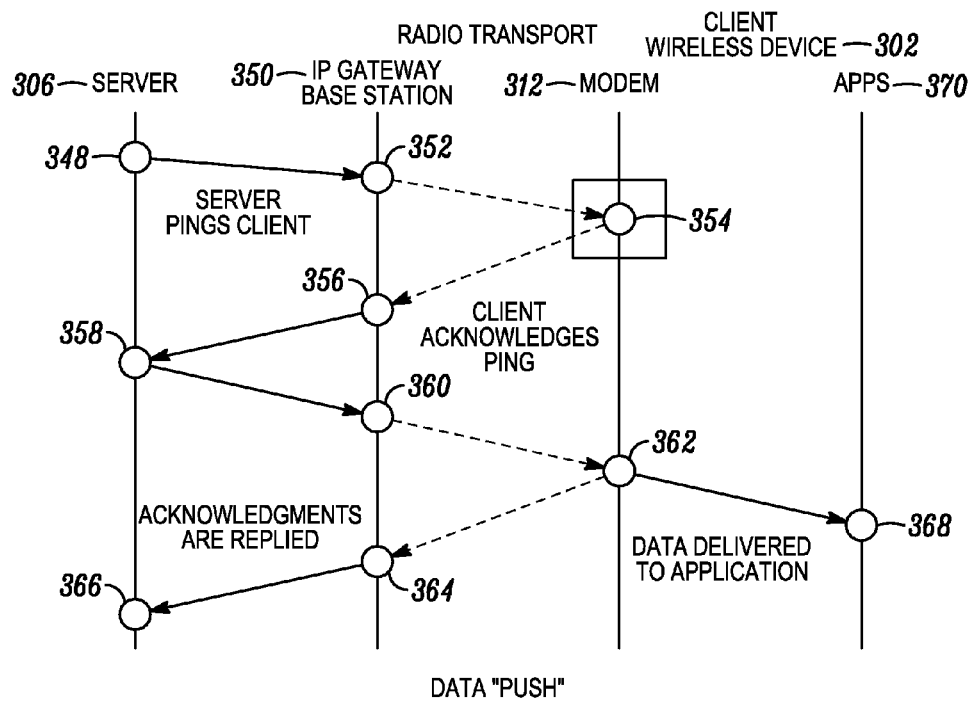
FIG. 3 represents a server communicating with an IP Gateway Base Station where the server in a data push event pings the client.
Figure 4:
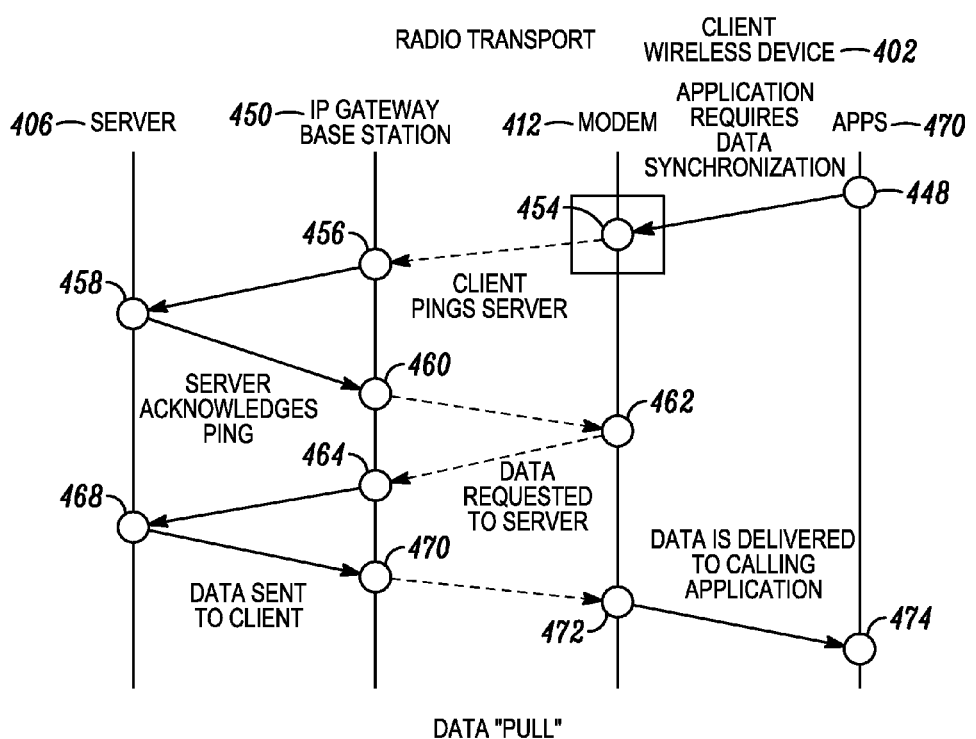
FIG. 4 represents an application of a client wireless device in a data pull event.

FIGS. 3 and 4 represent embodiments of a data push event and a data pull event, respectively. Both figures illustrate the extent of data synchronization during these events as indicated by the dotted lines.

FIG. 3 represents a server 306 communicating with an IP Gateway Base Station 350 where the server in a data push event 348 pings the client. The IP Gateway Base Station 350 communicates with the modem 312. At this point 354 the modem 312 estimates the power cost of the data transfer based on the network conditions. The client wireless device 302, in accordance with this discussion, will acknowledge the ping 352 if the power cost is considered low enough. If the client wireless device 302 considers the power cost low enough, the client acknowledges the ping, which is relayed to the server 358, the data is pushed to the client 360, which is in turn received by the modem 362 after data synchronization. Further data synchronization can occur as acknowledgements are replied 364 and delivered to the server 366. Alternatively or additionally, data can be delivered 368 to an application 370 of the client wireless device 302.

As discussed, if the network conditions are compromised, the communication at the point 354 can be terminated, that is prior to data synchronization. If the data to be synchronized (news, weather, social media, and the like) are not too time sensitive they can be delayed by either the application 370 or the server 306 until the power consumption conditions of the network connection are considered good enough by the modem 312 for the data transfer to be power efficient. This can extend battery life significantly because inefficient (low data throughput and high transmit power levels) data transfers are being avoided.

FIG. 4 represents an application 470 of a client wireless device 402 in a data pull event 448 where a determination by the controller 110 of a power consumption value of the initial communication is based on the measured network condition value processed by monitoring 454 the modem 412. An application of the modem baseband processor 230 (see FIG. 2) that preprocesses the communication makes the power calculation 236 can determine if, for an application that requires data synchronization, that the network conditions are acceptable to continue the communication or terminate it.

As discussed, if the network conditions are compromised, the communication at the point 454 can be terminated, that is prior to data synchronization. If the data to be synchronized (news, weather, social media, and the like) are not too time sensitive they can be delayed by the application 470 until the power consumption conditions of the network connection are considered good enough by the modem 412 for the data transfer to be power efficient. This can extend battery life significantly because inefficient (low data throughput and high transmit power levels) data transfers are being avoided.

If the client wireless device 402 considers the power cost low enough, the client pings the server 456, which is relayed to the server 458. The server acknowledges the ping 460 which is transmitted 462 to the modem 412. Data is requested 464, the server receives 468 the request, delivers 470 to the client so that it is received 472 by the modem 412 and then data is delivered 474 to the calling application 470.

Figure 5:
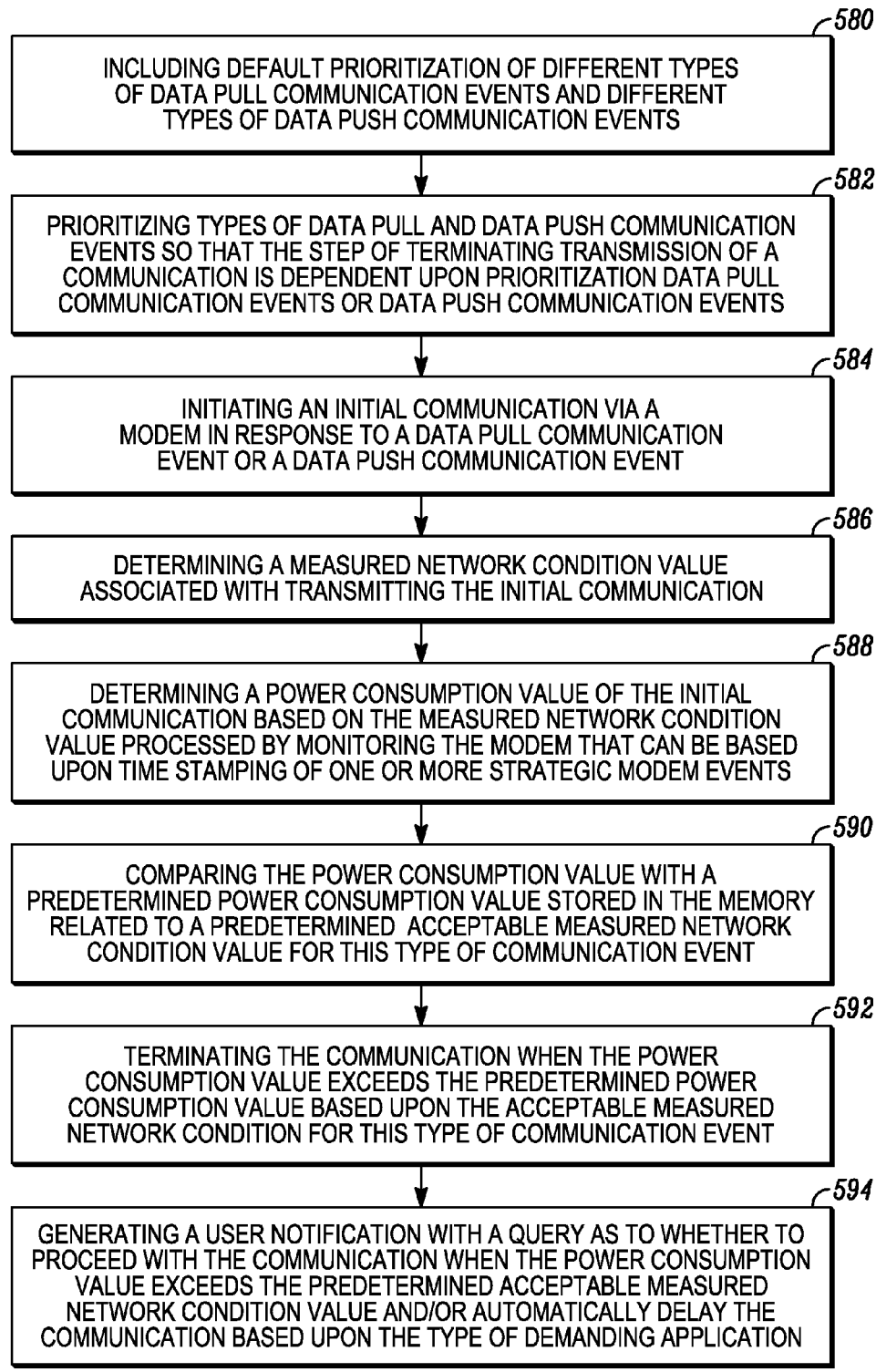
FIG. 5 is a flow chart depicting an embodiment of a described method.

FIG. 5 is a flow chart depicting an embodiment of a described method. In a possible first step the method can include a default prioritization 580 of different types of data pull communication events and different types of data push communication events. Also possible is prioritizing 582 types of data pull and data push communication events so that the step of terminating transmission of the communication is dependent upon prioritized pull communication events or push communication events.

An embodiment of the described methods can further include initiating 584 an initial communication via the modem in response to a data pull communication event or a data push communication event, determining 586 a measured network condition value associated with transmitting the initial communication, and determining 588 a power consumption value of the initial communication based on the measured network condition value processed by monitoring the modem by for example, determining channel quality, determining signal strength and/or determining a power level required for transmitting.

An embodiment of the described methods can further include comparing 590 the power consumption value with a predetermined power consumption value stored in the memory related to a predetermined acceptable measured network condition value for this type of communication event and terminating 592 the communication when the power consumption value exceeds the predetermined power consumption value based upon the acceptable measured network condition value for this type of communication event. It is also possible to generate 594 a user notification with a query as to whether to proceed with the communication when the power consumption value exceeds the predetermined acceptable measured network condition value.

In both the data push events and the data pull events, the data synchronization becomes "power-consumption-aware" before being attempted. It is understood that the described methods and devices can be implemented in any cellular modem device as a service or "power condition" state indication to applications or remote servers. It could especially be applicable to "always-connected" Smartphones running Android or other high level open operating systems allowing installed applications to have access to data connected services at any point time. The data power awareness sensitivity level feature could be configurable in devices system settings for flexibility.

The "power cost" of social media updates is very high. The described methods and devices could be extended to a standard for data synchronization adding appropriate "power-awareness" API's between cellular modem and applications, necessary "power-awareness" commands in client/server protocols and/or a sense of priority level of the transfer for not time critical content (weather, news, and the like).

In some circumstances, a cellular modem can constantly measure the network conditions and know in real time what is the channel quality, the receiver sensitivity and required transmit power levels. Based on parameters such as these, a cellular modem can estimate before a data synchronization is started at how much current drain or power the cost of this data transfer will be. Knowing the amount of data before initiating the data transfer will also help in this manner. In this way, the device could abort and/or delay the transfer required by the application if it is not heavily real time constraint.

As the demand for packet data is growing using wireless devices the battery life has become even more of a challenge. With older and new available application services such as e-mail, weather, news feeds, social media, and the like Smartphones are always connected devices. However the periodic data connections over the cellular modem required by these multiple services are significantly affecting battery current drain, thus reducing the mobility and the experience of the user. Furthermore the quality of the cellular link to the network is changing tremendously and rapidly depending on the cell conditions, the geographical position of the user and other parameters. Under non-favorable cellular network conditions the cost in power (or current drain) for synchronizing data may be multiplied by an important factor although the real time constraint of the data synchronization may not be relevant.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

The invention claimed is:

1. A communication device comprising:
   a memory;
   a modem configured for initiating an initial communication in response to a data pull communication event or a data push communication event; and
   a controller operatively connected to the memory and to the modem and configured for:
      determining a measured network condition value associated with transmitting the initial communication;
      determining a power consumption value of the initial communication based on the measured network condition value processed by monitoring the modem;
      comparing the power consumption value with a predetermined power consumption value stored in the memory related to a predetermined acceptable measured network condition value for this type of communication event; and
      if the power consumption value exceeds the predetermined power consumption value, then either:
      terminating the communication; or
      generating a user notification with a query as to whether to proceed with the communication.

2. The communication device of claim 1 wherein the controller is further configured for rescheduling the initial communication.

3. The communication device of claim 1 wherein the controller is further configured for, prior to terminating transmission of the initial communication, transmitting a message to reschedule the communication.

4. The communication device of claim 1 wherein the predetermined network condition value includes a default prioritization of different types of data pull communication events and different types of data push communication events.

5. The communication device of claim 1 wherein the controller is further configured for prioritizing types of data pull and data push communication events so that terminating transmission of the communication is dependent upon prioritized pull communication events or push communication events.

6. The communication device of claim 1 wherein determining a measured network condition associated with transmitting the communication comprises determining an element selected from the group consisting of: channel quality, signal strength, and a power level required for transmitting.

* * * * *